(No Model.) 5 Sheets—Sheet 2.
T. J. THORP.
RUNNING GEAR FOR WAGONS.

No. 432,002. Patented July 8, 1890.

Witnesses.
J. Henry Kaiser
Chas. E. Hunt.

Inventor:
Thomas J. Thorp (No Model.) 5 Sheets—Sheet 4.

T. J. THORP.
RUNNING GEAR FOR WAGONS.

No. 432,002. Patented July 8, 1890.

ATTEST.
J. Henry Kaiser.
Chas. E. Hunt.

INVENTOR
Thomas J Thorp (No Model.)  5 Sheets—Sheet 5.

T. J. THORP.
RUNNING GEAR FOR WAGONS.

No. 432,002.  Patented July 8, 1890.

ATTEST.
J. Henry Kaiser
Chas. E. Hunt

INVENTOR
Thomas J. Thorp

UNITED STATES PATENT OFFICE.

THOMAS J. THORP, OF FLAGSTAFF, ARIZONA TERRITORY, ASSIGNOR OF ONE-HALF TO D. J. BRANNEN, OF SAME PLACE.

RUNNING-GEAR FOR WAGONS.

SPECIFICATION forming part of Letters Patent No. 432,002, dated July 8, 1890.

Application filed March 30, 1889. Serial No. 305,489. (No model.)

*To all whom it may concern:*

Be it known that I, THOMAS J. THORP, of the village of Flagstaff, county of Yavapai, and Territory of Arizona, have invented a new and useful Improvement in Running-Gear for Wagons and other Wheeled Vehicles, of which the following is a specification.

The object of the invention is to provide a conveniently-arranged running-gear having desirable strength and composed of parts that can be easily assembled and most of which are replaceable, when worn or broken, by persons of ordinary skill; and the invention consists in matters hereinafter described and pointed out.

Figure 1:
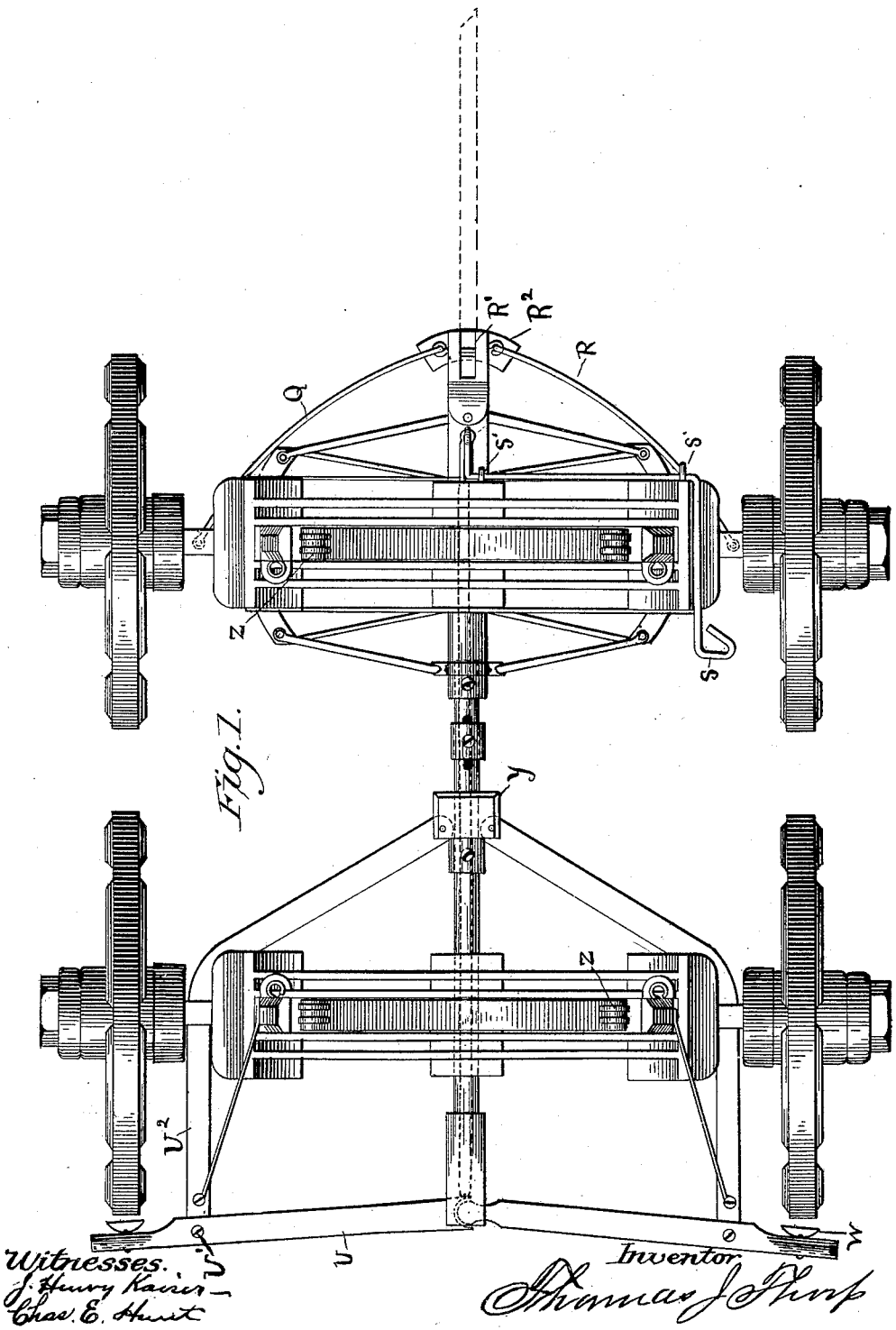
Figure 2:
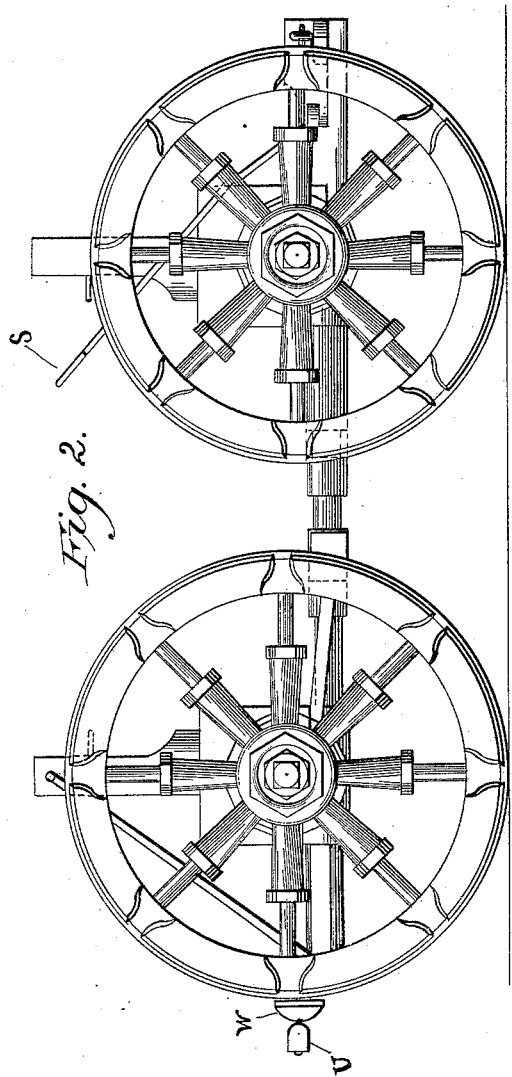
Figure 3:
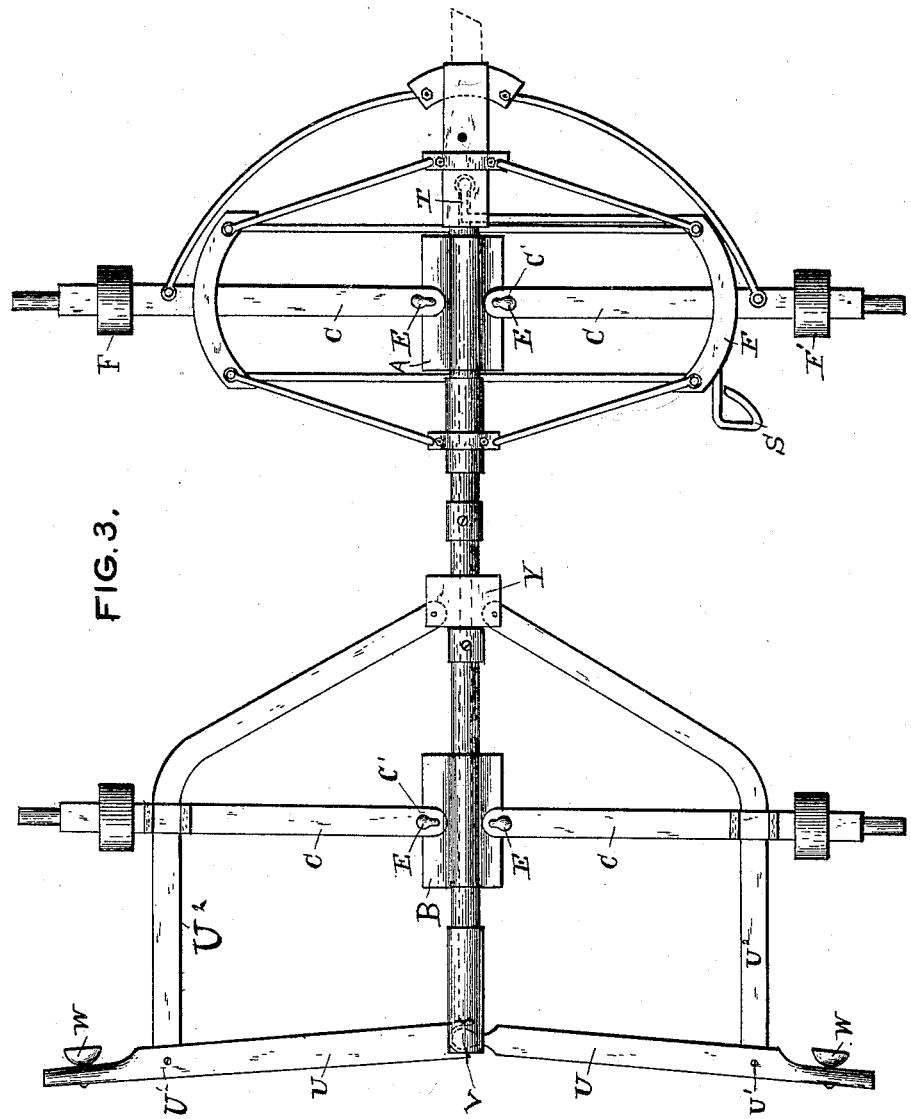
Figure 4:
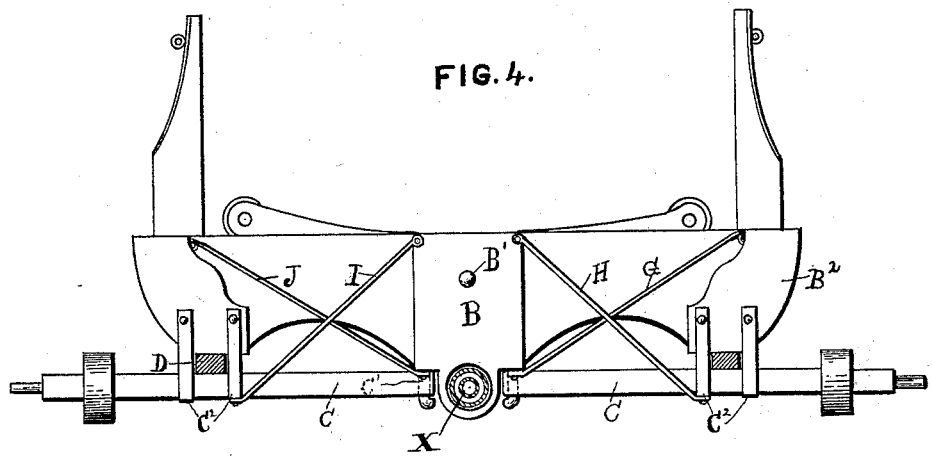
Figure 5:
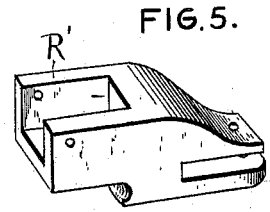
Figure 15:
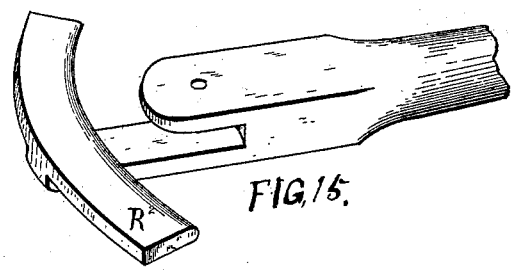
Figure 6:
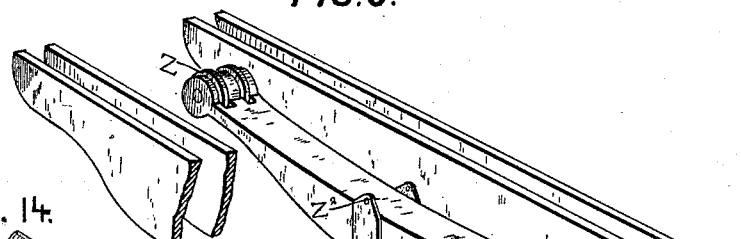
Figures 7, 8, 14:
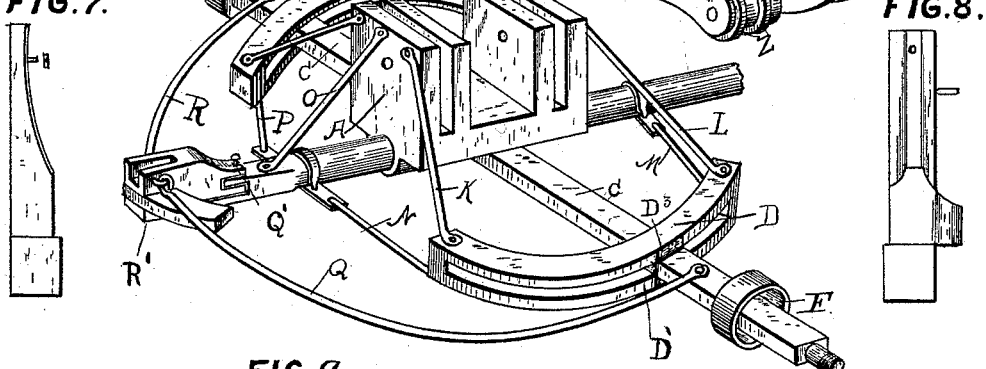
Figure 9:
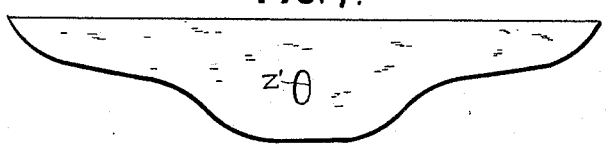
Figures 10, 11:
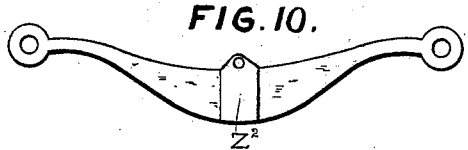
Figures 12, 13:
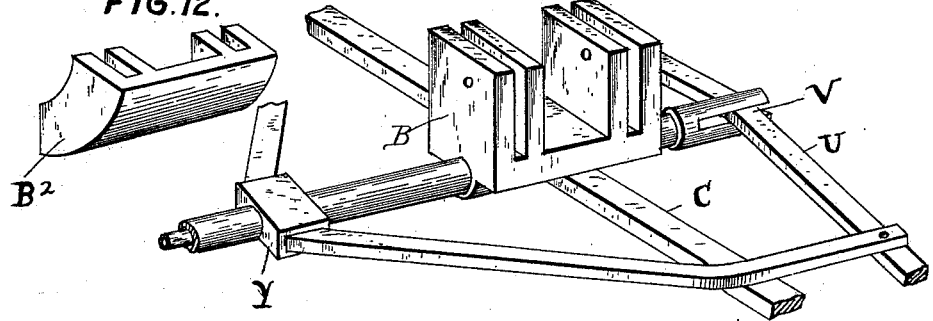

In the drawings, Figure 1 is a plan view of a running-gear made in accordance with my invention. Fig. 2 is a side elevation of the same. Fig. 3 is a plan view of the running-gear turned bottom upward. Fig. 4 is an elevation of the rear axle and bolster. Fig. 5 is a perspective view of the front end of the reach and tongue-frame. Figs. 6, 7, and 8 are detail views of the sections of the bolster and the stakes to the bolster. Fig. 9 is an elevation of one section or part of the bolster. Fig. 10 is a like view of the elliptic spring. Fig. 11 is a perspective of the tongue-frame, circular segment, and front end of reach. Fig. 12 is a perspective view of the shoe to hold the sections of the bolster and the stake in place. Fig. 13 is a like view of the truss-plate, hollow reach, and hounds. Fig. 14 is a similar view of the front running-gear. Fig. 15 is a view of front end of reach.

A denotes a truss-plate, which is used to hold the sections of the bolster and elliptic springs in place, and it also serves as a truss-abutment between the two sections of the axle. B is a similar truss-plate, and serves the same purpose between the sections of the hind axle.

C is a section of the axle having at its inner end a hole or eye to receive the stud E.

D is the outer bearing to the front axle. (See Fig. 14.)

F is the inner bearing for a hub, as seen in Figs. 3 and 14.

G, H, I, and J are truss-rods, as seen in Fig. 4, and serve to distribute the strain from the center of the axle and bolster.

K, L, M, N, O, and P are truss-rods, and serve to hold the outer bearings of the front axles in place and distribute strain from the center of the front axle. (See Fig. 14.)

Q and R are draft-rods for the front axles and tongue-frame.

S is a bent brake-lever journaled at S' S' for operating the hollow brake-rod through the slot T in the hollow reach, both the lever and the slot being indicated by dotted lines in Fig. 3, and the brake-rod being shown in section in Fig. 4.

U U are the brake-lever arms operated by the hollow brake-rod.

V is the bearing of the brake-lever arms in the open slot in the rear end of the hollow reach.

Y is the hound-coupling, and Z are friction-wheels attached to the spring.

As will be readily understood, the two parts of each axle are at their inner ends attached to the studs or bearings E on the bottom of the respective truss-plates A B. The hollow reach inclosing a tubular brake-rod X is held in a tubular seat in the bottom of said plates adjacent to the said axle-fastenings. The rear axle is supported by hangers $C^2$, attached to the shoes which receive the ends of the bolster, which shoes ride upon the bearings D and are stayed and supported by truss-rods, as shown. The rear springs between the bolster-sections are supported by a bolt B', and the stakes are supported in the shoes between the bolster-sections and at the end of the springs. The forward springs are supported by a bolt passing through holes in a clip $Z^2$, (see Fig. 10,) surrounding the same, and through an oblong hole Z' in the bolster.

The bolster consists of four parts, the two outer of which are supported in the outer channels of the truss-plate, the two inner parts separated by a spring, occupying the central channel in said plate. These several parts are bolted together by bolt B', and the outer ends of the several members of the bolster rest in the shoe $B^2$. (See Fig. 12.) The inner recesses of each of these shoes are made wider than the outer to receive two members of the bolster and a stake between them. The stakes are made of the same width as the springs, and these devices fill the whole recess transversely to the length of the bolster.

The relative position of the bolster sections and springs is indicated in Fig. 6, the other parts being omittted. The bearings D are stayed by truss-rods, as represented. The brake-lever S is bent and supported to turn in bearings S', and is suitably connected at T with a rod X, that is pivotally connected to the levers U, which levers are fulcrumed, as at U', upon the hounds $U^2$, and pivoted to the fixed block V. Downward pressure upon the levers S will move rod X to apply the brakes, and they are released by a reverse movement. The tongue-frame R' is bolted to the forward end of the reach at Q'. The draft-rods Q R are attached to a bolt or bolts in this tongue-frame, or they may be secured to the brackets or wings $R^2$ of the reach. At $D^3$ is a removable friction-plate, which moves in the slot D' of the bearings D.

The above-described parts having been assembled and connected, as stated, and as indicated in Figs. 1, 2, and 3 and elsewhere, constitute an efficient and durable running-gear for wagons.

Having thus described my invention, what I desire to secure by Letters Patent is—

1. The combination of the axle made in two parts and provided with stud or lug engaging eyes, with the bolster-supporting plate having studs to engage said eyes, and having an opening for the reach, said reach, the trusses, the slotted bearing-plates, and the bolster consisting of the several members, substantially as set forth.

2. The bolster, in combination with the supporting or truss plate and with the supporting-shoe, said plate and shoe embracing the bolster at its middle and ends, substantially as set forth.

3. In a wagon, the bolster-supporting plate provided on its upper side with recesses to receive the four-part bolster and spring and with lugs to engage the axle, and with a transverse channel or opening situated between said lugs, substantially as set forth.

4. In a wagon, the bolster-supporting shoes provided with recesses to receive the several members of the bolster, the inner recess being sufficiently wide to receive two members of the bolster and between them the stakes, substantially as set forth.

5. The combination of the bolster-supporting plate with the springs suspended from said plate and bolted to the bolster and provided with friction-wheels, and the shoes adapted to receive the ends of the bolster, substantially as set forth.

6. The combination of the tongue provided with a mortise and with the wings, the tongue-frame fitted to said mortise and resting on the wings and provided with a recess for the reach, and said reach, substantially as set forth.

7. The combination of the hounds, the coupling on the reach, the rear axle, the pivoted brake-levers and brakes, the hollow reach, and the brake-rod extending through the hollow reach to the front, substantially as set forth.

8. The combination of the hollow reach with the brake-rod located therein and with a brake, substantially as set forth.

THOMAS J. THORP.

Witnesses:
R. F. POINDEXTER,
D. J. BRANNEN.